(12) United States Patent
Heidingsfelder et al.

(10) Patent No.: US 9,562,537 B2
(45) Date of Patent: Feb. 7, 2017

(54) EXHAUST-GAS TURBOCHARGER

(71) Applicant: BorgWarner Inc., Auburn Hills, MI (US)

(72) Inventors: Leif Heidingsfelder, Ramstein (DE); Nico Kanoffsky, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 353 days.

(21) Appl. No.: 14/396,149

(22) PCT Filed: Apr. 19, 2013

(86) PCT No.: PCT/US2013/037276
§ 371 (c)(1),
(2) Date: Oct. 22, 2014

(87) PCT Pub. No.: WO2013/163011
PCT Pub. Date: Oct. 31, 2013

(65) Prior Publication Data
US 2015/0086341 A1  Mar. 26, 2015

(30) Foreign Application Priority Data
Apr. 27, 2012 (DE) .................. 10 2012 008 464

(51) Int. Cl.
*F01D 17/16* (2006.01)
*F04D 27/00* (2006.01)
(Continued)

(52) U.S. Cl.
CPC ........... *F04D 27/002* (2013.01); *F01D 17/165* (2013.01); *F02B 37/186* (2013.01); *F02B 37/22* (2013.01);
(Continued)

(58) Field of Classification Search
CPC  F02B 37/186; F05D 2250/90; F05D 2260/40; F05D 2260/50; F01D 17/165
See application file for complete search history.

(56) References Cited

U.S. PATENT DOCUMENTS 8,585,012 B2 * 11/2013 Labataille ............... F16K 1/221
251/129.04
9,435,220 B2 * 9/2016 Alajbegovic ........... F01D 17/20
(Continued)

FOREIGN PATENT DOCUMENTS

| DE | FR 3011274 A1 * | 4/2015 | ........... F01D 17/165 |
|----|-----|-----|-----|
| WO | 9513462 A1 | 5/1995 | |

OTHER PUBLICATIONS

International Search Report in International Application No. PCT/US2013/037276 dated Jul. 29, 2013.

*Primary Examiner* — Ninh H Nguyen
(74) *Attorney, Agent, or Firm* — A. Michael Tucker; Stephan A. Pendorf; Patent Central LLC

(57) ABSTRACT

An exhaust-gas turbocharger (1) having a turbine (2) which is provided with a variable turbine geometry and/or with a wastegate; and having an actuator (6) which is connected to the variable turbine geometry and/or to the wastegate by means of a coupling rod (9) composed of plastic. The coupling rod (9) is connected, at its end regions, by means of a first eyelet (8) at one side to a pin (7) of the actuator (6) and by means of a second eyelet (12) at the other side to a pin (11) of an adjusting lever (10) of the variable turbine geometry and/or of the wastegate. The eyelets (8, 12) of the coupling rod (9) are provided with in each case one metal sleeve (13 and 14 respectively).

15 Claims, 3 Drawing Sheets

Figure 2:
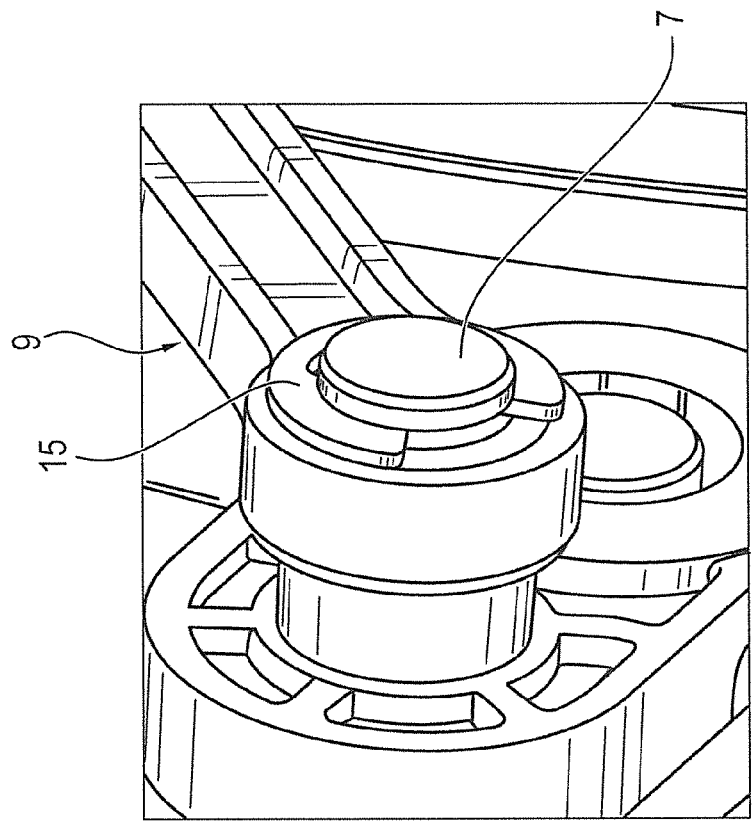

(51) Int. Cl.
 *F02B 39/00* (2006.01)
 *F02B 37/18* (2006.01)
 *F02B 37/22* (2006.01)
 *F04D 17/02* (2006.01)

(52) U.S. Cl.
 CPC ............. *F02B 39/00* (2013.01); *F04D 17/025* (2013.01); *F05D 2250/90* (2013.01); *F05D 2260/50* (2013.01); *Y02T 10/144* (2013.01)

(56) References Cited

U.S. PATENT DOCUMENTS

| | | | |
|---|---|---|---|
| 2003/0185672 A1* | 10/2003 | Suganami | H02K 7/1166 415/150 |
| 2004/0096317 A1 | 5/2004 | Scholz et al. | |
| 2005/0022625 A1 | 2/2005 | Nonoshita | |
| 2008/0110169 A1 | 5/2008 | Roh | |
| 2011/0097197 A1 | 4/2011 | Woo et al. | |

\* cited by examiner

EXHAUST-GAS TURBOCHARGER

The invention relates to an exhaust-gas turbocharger according to the preamble of claim 1.

An exhaust-gas turbocharger of said type is known from DE 10 2008 053 079 A1. In said known design, a coupling rod connects the actuator (for example an electric actuator or a pneumatic control capsule) to the assembly of an adjusting lever of an adjustable turbine geometry (VTG), also referred to as a guide grate. Here, the coupling rod transmits the movement generated by the actuator to the VTG. Instead of a VTG or in addition to the VTG, the use of a coupling rod is also possible in the case of an exhaust-gas turbocharger having a wastegate which constitutes a turbine bypass. Here, the coupling rod which is composed of plastic is mounted on a pin assigned to the actuator and on a pin assigned to the adjusting lever, and is secured by means of a lock washer. The known coupling rod however has the disadvantage of a high level of wear at its eyelets into which the pins of the actuator and of the adjusting lever are inserted.

It is therefore an object of the present invention to provide an exhaust-gas turbocharger of the type indicated in the preamble of claim 1 which permits a reduction of the wear of its coupling rod.

This object is achieved by the features of claim 1.

By virtue of the fact that the eyelets of the coupling rod are provided with metal sleeves, the invention makes it possible for the wear of the coupling rod eyelets to be reduced considerably.

The dependent claims contain advantageous developments of the invention.

Claims 8 and 9 define a coupling rod as an object which can be marketed independently.

Figure 1:
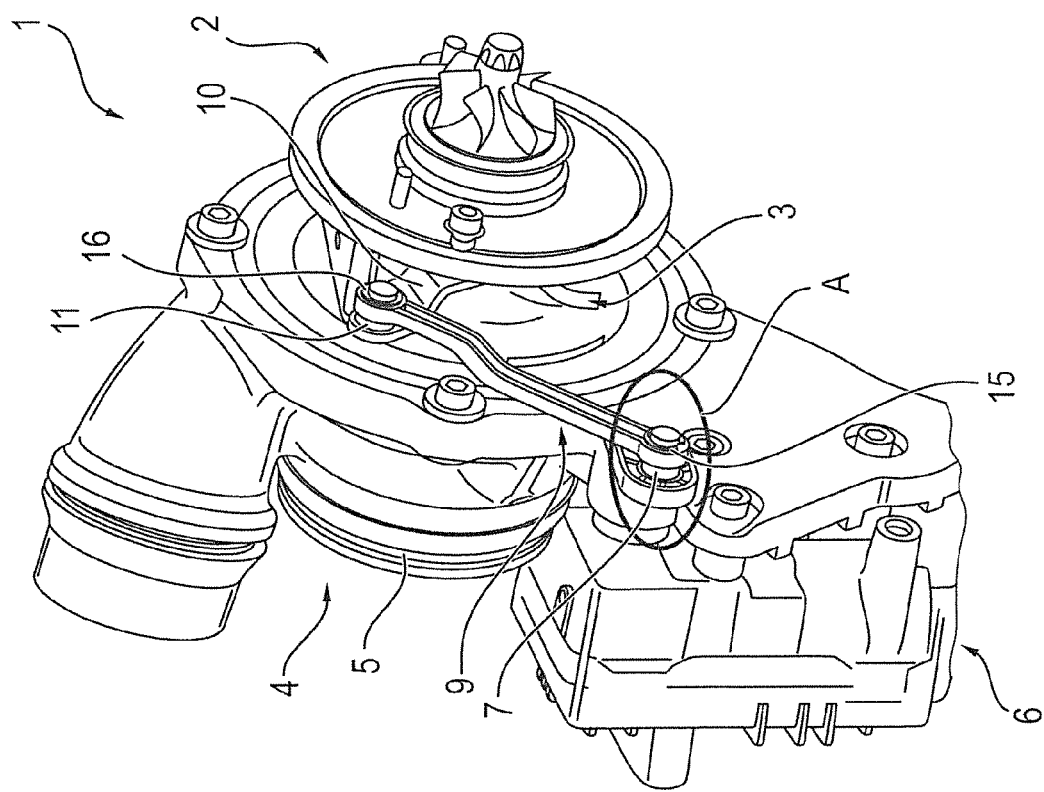
Figure 3:
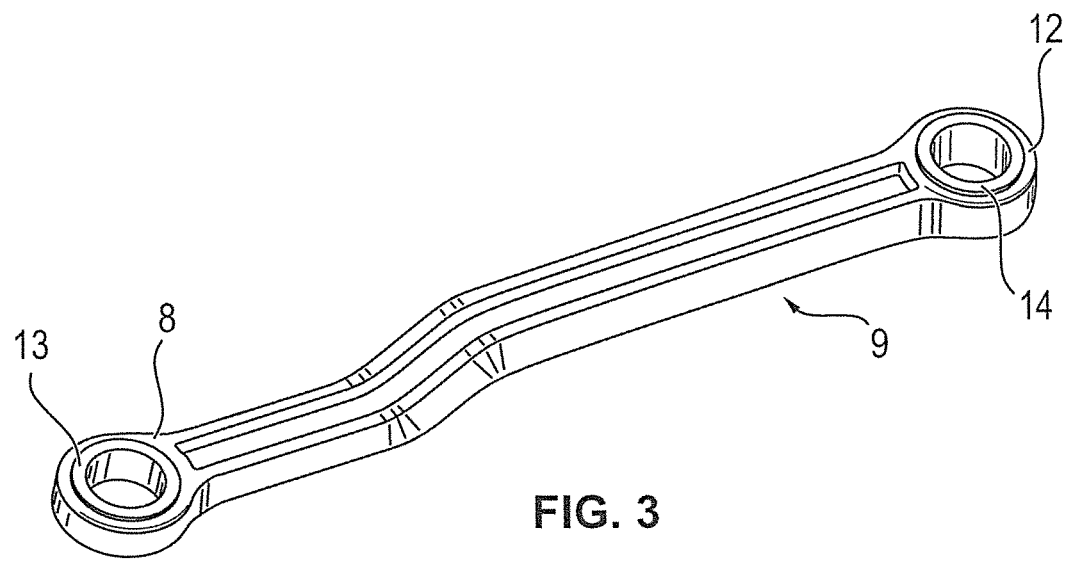
Figure 4:
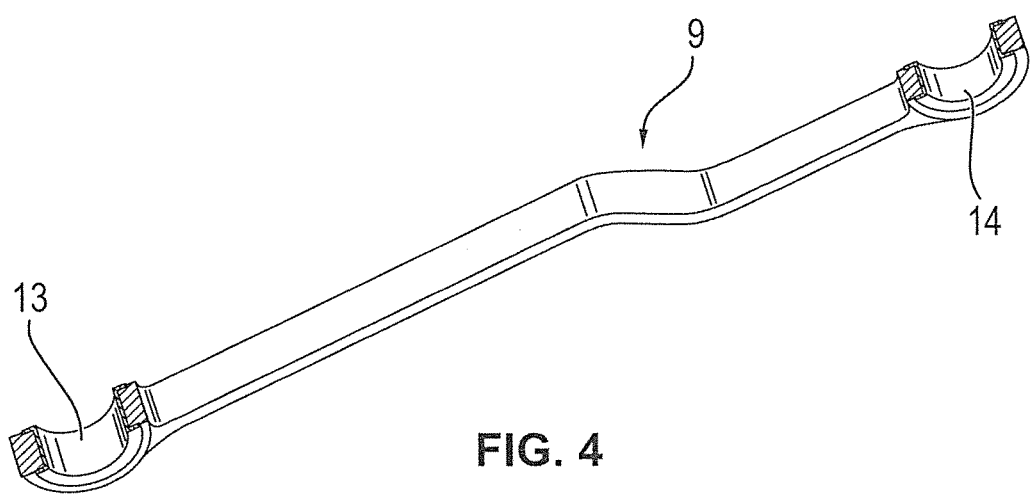
Figure 5:
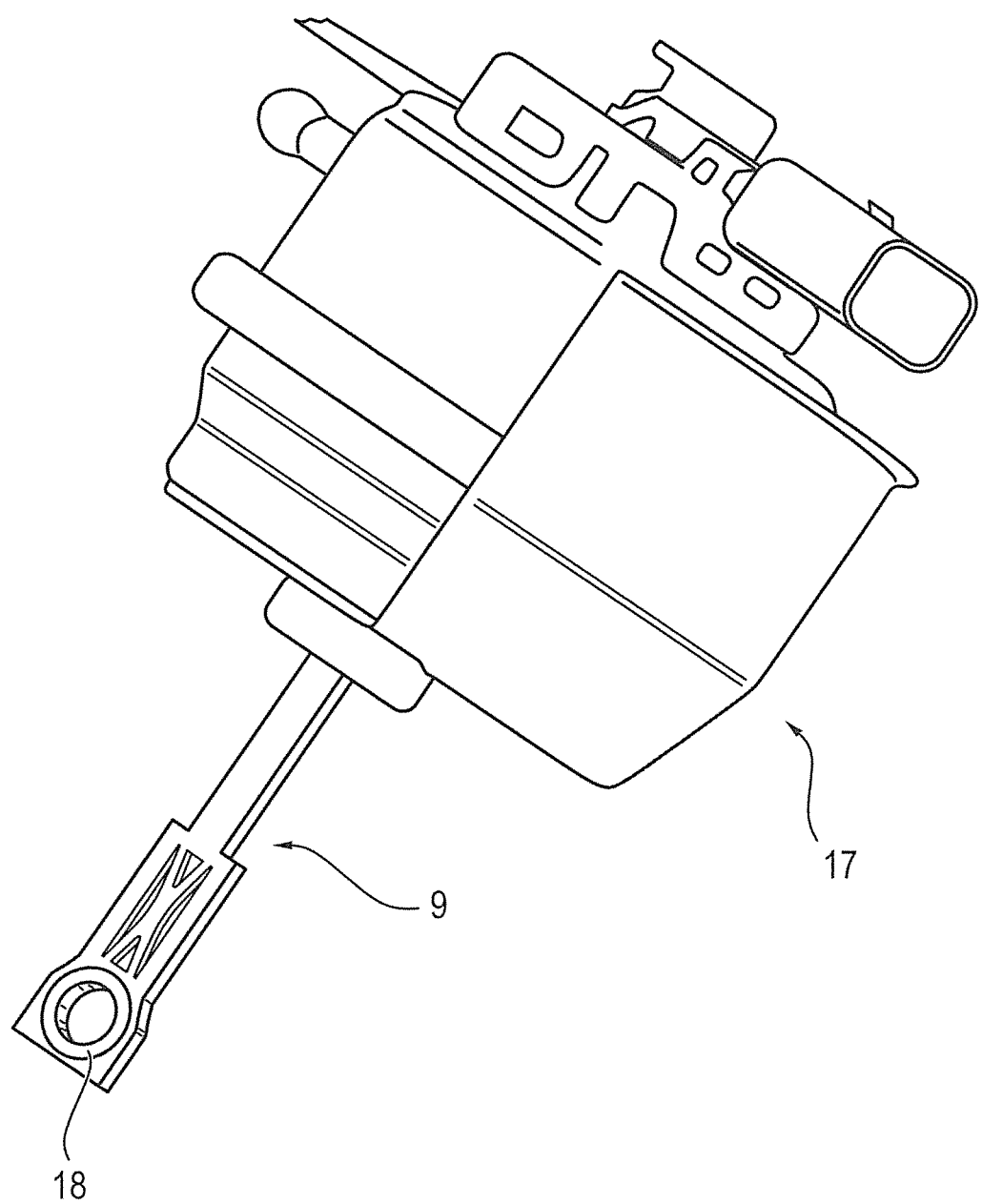

Further details, features and advantages of the invention become apparent from the following description of an exemplary embodiment with reference to the drawing, in which:

FIG. 1 shows a perspective illustration of an exhaust-gas turbocharger according to the invention, FIG. 2 shows an enlarged view of the detail A in FIG. 1, FIG. 3 shows a perspective view of the coupling rod according to the invention, FIG. 4 shows a perspective illustration of the coupling rod with the eyelets sectioned, and FIG. 5 shows a perspective illustration of a pneumatic actuator.

FIG. 1 shows a perspective view of a turbocharger 1 according to the invention. The turbocharger 1 has a turbine 2, the housing of which is not shown in FIG. 1. The turbocharger 1 also has a bearing housing 3 and a compressor 4 with a compressor housing 5, said compressor housing being connected to the bearing housing 3 which in turn is connected to the turbine housing (not illustrated).

The turbocharger 1 is furthermore provided with an actuator 6 which, in the example, is fixed to the compressor housing 5 and may be in the form of an electric actuator or pneumatic actuator.

The actuator 6 has a pin 7 which is inserted into a first eyelet 8 of a coupling rod 9 which is illustrated in detail in FIGS. 3 and 4. The turbine 2 is equipped with a variable turbine geometry (likewise not illustrated in any more detail) which is symbolized by an adjusting lever 10 which has a pin 11 which is inserted into a second eyelet 12 of the coupling rod 9.

As can be seen in particular from the illustration of FIGS. 3 and 4, the eyelets 8 and 12 of the coupling rod 9 are provided in each case with a metal sleeve 13 and 14 respectively. The illustration of FIG. 4 in particular, which is sectioned in the region of the eyelets 8 and 12, shows here that, in this particularly preferred embodiment, the plastics material of the coupling rod 9 surrounds the metal sleeves 13 and 14 at the outer circumference thereof, such that an integration of said metal sleeves 13 and 14 into the plastics material of the coupling rod 9 is possible by a process of encapsulation by injection molding.

In the embodiment of the coupling rod 9 according to the invention illustrated in FIGS. 1 to 4, said coupling rod has a cranked design. It is however alternatively also possible for the coupling rod 9 to be of rectilinear design.

FIGS. 1 and 2 also show that, for the fixing of the pins 7 and 11, lock washers 15 and 16 respectively are provided which are mounted on the pins 7 and 11 respectively and thus fix the coupling rod 9.

The embodiment illustrated in FIG. 5 shows the use of a coupling rod 9 according to the invention in a pneumatic actuator 17. It is provided here that the internal control rod of the actuator 17 has, at least at its outer end, a region in which a metal bushing 18 is embedded into a rod region composed of plastic.

In addition to the above written disclosure of the invention, reference is hereby explicitly made to the illustrative disclosure thereof in FIGS. 1 to 5.

LIST OF REFERENCE SIGNS

1 Exhaust-gas turbocharger
2 Turbine
3 Bearing housing
4 Compressor
5 Compressor housing
6 Actuator
7 Pin
8 Eyelet
9 Coupling rod
10 Adjusting lever
11 Pin
12 Eyelet
13, 14 Metal sleeves
15, 16 Lock washers
17 Actuator
18 Metal bushing

The invention claimed is:

1. An exhaust-gas turbocharger (1) having
a turbine (2) which is provided with a variable turbine geometry and/or with a wastegate; and
an actuator (6) which is connected to the variable turbine geometry and/or to the wastegate by means of a coupling rod (9) composed of plastic, wherein the coupling rod (9) is connected, at its end regions, by means of a first eyelet (8) at one end to a pin (7) of the actuator (6) and by means of a second eyelet (12) at the other end to a pin (11) of an adjusting lever (10) of the variable turbine geometry and/or of the wastegate,
wherein
the eyelets (8, 12) of the coupling rod (9) are provided with in each case one metal sleeve (13 and 14 respectively).

2. The exhaust-gas turbocharger as claimed in claim 1, wherein the metal sleeves (13, 14) are cast at the edge into the plastics material of the coupling rod (9) by a process of encapsulation by injection molding.

3. The exhaust-gas turbocharger as claimed in claim 1, wherein the coupling rod (9) is of rectilinear design.

4. The exhaust-gas turbocharger as claimed in claim 1, wherein the coupling rod (9) is of crank design.

5. The exhaust-gas turbocharger as claimed in claim 1, wherein the pins (7, 11) are fixed in the eyelets (8, 12) of the coupling rod (9) by means of lock washers (15 and 16 respectively).

6. The exhaust-gas turbocharger as claimed in claim 1, wherein one end region of the coupling rod (9) is connected to an electric actuator.

7. The exhaust-gas turbocharger as claimed in claim 1, wherein the coupling rod (9) is a control rod of a pneumatic actuator.

8. A coupling rod (9) of an exhaust-gas turbocharger (1) made from a plastic material, having two end regions which are spaced apart from one another and in which eyelets (8 and 12) are formed, wherein the eyelets (8, 12) are provided with in each case one metal sleeve (13 and 14); wherein one of the eyelets is configured to engage with a pin of an actuator and the other of the eyelets is configured to engage with a pin of an adjusting lever.

9. The coupling rod as claimed in claim 8, wherein the metal sleeves (13, 14) are cast at the edge into the plastics material of the coupling rod (9) by a process of encapsulation by injection molding.

10. The coupling rod as claimed in claim 8, wherein the coupling rod (9) is of rectilinear design.

11. The coupling rod as claimed in claim 8, wherein the coupling rod (9) is of crank design.

12. The coupling rod as claimed in claim 8, wherein the pins (7, 11) are fixed in the eyelets (8, 12) of the coupling rod (9) by means of lock washers (15 and 16 respectively).

13. The coupling rod as claimed in claim 8, wherein one end region of the coupling rod (9) is connected to an electric actuator.

14. The coupling rod as claimed in claim 8, wherein the coupling rod (9) is a control rod of a pneumatic actuator.

15. The coupling rod as claimed in claim 8, having two end regions which are spaced apart from one another and in which eyelets (8 and 12) are formed, wherein the eyelets (8, 12) are provided with in each case one metal sleeve (13 and 14).

* * * * *